United States Patent

Blanchard et al.

[15] 3,651,616
[45] Mar. 28, 1972

[54] PROCESS FOR EFFECTING ABSORPTION OR REMOVAL OF GAS FROM A LIQUID

[72] Inventors: Alain Blanchard, Lyon; Alphonse Faure, Bron, both of France

[73] Assignee: Rhone-Poulenc S.A., Paris, France

[22] Filed: Feb. 13, 1969

[21] Appl. No.: 799,059

[30] Foreign Application Priority Data

Feb. 14, 1968  France....................................139879

[52] U.S. Cl............................55/16, 23/258.5, 55/55, 55/97, 195/1.8, 210/23
[51] Int. Cl................B01d 53/22, B01d 31/00, B01d 12/00
[58] Field of Search...................55/16, 55, 97, 158; 210/23, 210/63, 221; 23/258.5; 195/1.8

[56] References Cited

UNITED STATES PATENTS

| | | | |
|---|---|---|---|
| 2,972,349 | 3/1961 | DeWall | 210/321 X |
| 3,132,094 | 5/1964 | McKelvey et al. | 210/23 |
| 3,455,792 | 7/1969 | Ohta | 55/97 X |

OTHER PUBLICATIONS

Lyman et al., " The Effect of Chemical Structure and Surface Properties of Polymers on the Coagulation of Blood," from Vol. XI Trans. Amer. Soc. Ortip Tut. Organs 1965, p. 301–305

*Primary Examiner*—John Adee
*Attorney*—Cushman, Darby & Cushman

[57] ABSTRACT

Gases, e.g., oxygen, are advantageously absorbed by or removed from aqueous liquids, especially blood, by passage along a partial pressure gradient through a waterproof, porous membrane having pores with an apparent diameter of 0.01 to $3\mu$ and a critical surface tension of less than 40 dynes/cm. at 20° C.

10 Claims, 1 Drawing Figure

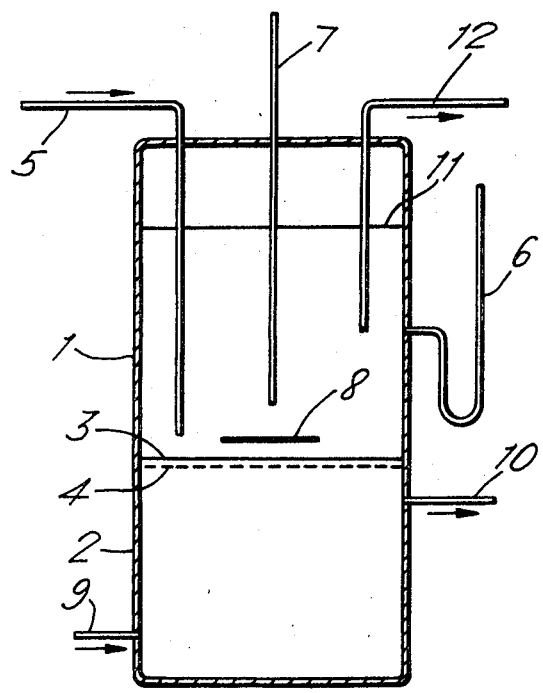

PROCESS FOR EFFECTING ABSORPTION OR REMOVAL OF GAS FROM A LIQUID

This invention relates to processes and apparatuses for effecting absorption or removal of gas from an aqueous liquid.

It is often desirable to be able to increase the content of particular dissolved or bound gases in an aqueous liquid, or to be able to reduce the content of particular gases in an aqueous liquid, or to do both simultaneously. One important such case is the oxygenation of blood, with or without simultaneous removal of carbon dioxide. Gaseous anaesthetics may also be administered by direct absorption in the blood.

The oxygenation of blood is useful, for example, in the case of surgical operations during which it becomes necessary to interrupt the circulation of blood through the lungs, so that, in order to keep the patient alive, it is necessary to supply the blood with oxygen and to free it from carbon dioxide in an artificial blood circuit. Likewise, in the case of chronic respiratory insufficiency, it may be necessary to aid respiration.

In order to do this, it is necessary to bring the blood into contact with an oxygen-containing medium as intimately as possible to enable the oxygen to enter the blood and to enable the carbon dioxide to leave it.

One proposed means of effecting this oxygenation of the blood consists in injecting a current of oxygen, or optionally oxygen-enriched air, as bubbles into an apparatus provided in the artificial blood circuit. The gas exchange takes place at the surface of the bubbles thus formed. In 1882, Schroder had already made experiments in this direction. Many others thereafter endeavoured to improve this method, because the direct injection of oxygen may produce either a destruction of the cellular elements and proteins of the blood, or, when the latter is not completely freed from oxygen bubbles, a gaseous embolus in the return of the blood into the circulatory apparatus. It is because of the latter danger that foam-destroying devices have been developed (see U.S. Pat. No. 2,833,279 and French Pat. No. 1,283,603, for example).

It has also been proposed to employ so-called "permeable" membranes. The mechanism of permeation through these membranes is well known (for example A. Lebovits, Modern Plastics, March, 1966). Such membranes are not porous and the passage of a gas through them takes place by dissolution on the face of the membrane which is situated on the side on which the concentration is higher, diffusion through the membrane, and desorption on the other face of the membrane. Various membranes of this type have been employed, notably silicone elastomers, (see U.S. Pat. No. 3,015,331 and Japanese Pat. No. 442,678). It is also possible to use a liquid membrane such as water (see, for example, French Pat. No. 1,206,650). In these various cases, there is no bubble formation and no agitation, but the rate of gas exchange through the membrane remains low, so that it is generally necessary to bring the blood into contact with the oxygenated medium through large membrane surfaces. This is not desirable, because it is advantageous to bring the blood into contact with the smallest possible surface of materials foreign to the organism in order to avoid danger of coagulation and to reduce the volume of blood extravasated.

It has also been proposed to pass a current of oxygen over a thin layer of blood. Such methods have been described more particularly with reference to the use of disc-type apparatus, but with these methods the danger of haemolysis always exists and the quantity of blood extravasated is considerable.

A new process has now been found for effecting absorption of gases by, or removal of gases from, aqueous liquids, which is especially suitable for the oxygenation of blood, with or without simultaneous removal of carbon dioxide. This new process comprises bringing the said liquid into contact with one side of a waterproof porous membrane having pores with an apparent diameter of 0.01 to $3\mu$, preferably 0.05 to $1.5\mu$, and having a critical surface tension less than 40 dynes/cm. at 20° C., the other side of the said membrane being in contact with a gas or gas mixture having a total pressure from 0.01 bar gauge to the pressure of the said liquid, any gas to be absorbed by the said liquid having a partial pressure higher than the partial pressure of the same gas in the said liquid and any gas to be removed from the said liquid having a partial pressure lower than the partial pressure of the same gas in the said liquid. Apparatus for carrying out this process is within the scope of the invention. By "porous membrane" is meant a material through which a gas can pass by simply following the path of the pores and not by diffusion as in the case of "permeable" membranes.

The critical surface tension is defined in the work by R. L. Patrick: Treatise on adhesion and adhesives (1967), pp. 171–175. It is generally expressed in dynes/cm.

The material of which the porous membranes consist may be waterproof by nature or it may be waterproofed. Examples of materials which may be employed, include polytetrafluoroethylene, polyvinyl chloride, polyethylene and polyacrylonitrile previously brought into porous form by an appropriate treatment, for example by sintering, coagulation or extraction of incorporated soluble products. Those materials whose critical surface tension is below 40 dynes/cm. (for example polytetrafluoroethylene, polyethylene and polyvinyl chloride) may be used as such. The others (for example polyacrylonitrile) require a waterproofing treatment. These materials may be employed alone or in association with a support such as a woven fabric.

It is also possible to use a fibrous material, for example, a sheet of porous paper comprising waterproofed fibres. Preferably, there is employed a sheet obtained from polynosic fibres (fibres of regenerated microfibrillar cellulose) having a count of 0.4 denier and a length of 20 to 30 mm. The production of this paper is described in French Pat. No. 1,272,081. The pores of this paper have the advantage of having regular dimensions equivalent to a diameter of the order of $0.05\mu$.

The waterproofing composition required with some hydrophilic materials may be chosen from the known compositions which are sufficiently tolerated by the organism whose blood is being treated. It may be especially based upon organosilicon compounds or fluorinated polymers. Preferably, an organopolysiloxane composition vulcanisable to form an elastomer at ambient temperature is employed. Such compositions are described, for example, in French Pat. No. 1,198,749. The critical surface tension of organopolysiloxane elastomers is about 20–25 dynes/cm. It is to be noted that the waterproofing composition must not clog the pores of the membrane, but must simply line them so as to prevent the penetration of blood into the pores by capillary action.

The waterproofing treatment may take place by simple immersion of the porous support in a solution of the waterproofing composition in an appropriate diluent, the nature of this diluent being related to that of the waterproofing composition and of the porous support. The concentration of the solution, the duration of the immersion and the number of immersions in this solution (or the speed of travel through the solution if the impregnation takes place continuously) may readily be determined by one skilled in the art, the essential requirement being that the waterproofing composition should not clog the pores, which can readily be checked by gas permeability tests.

In the method according to the invention, the pressure of the oxygen or other gas supplied to the blood must be lower than or equal to that of the blood. Generally, the pressure of the blood entering an oxygenating apparatus in the arterial pressure (about 0.15 bar), and it is desirable not to increase this pressure because the use of pumps results in agitation of the blood, which is likely to cause haemolysis. Having regard to the foregoing, the excess of the pressure of the oxygen over atmospheric pressure may be from 0.01 bar up to the pressure of the blood in contact with the membrane.

The porous membranes described above may advantageously be used in place of the permeable membranes at present employed in apparatus for oxygenating the blood. They permit the exchange of considerable volumes of gas, and consequently they make it possible to extravasate only a relatively small quantity of blood as compared with the other types of membrane.

The following Examples illustrate the invention.

EXAMPLE 1 a. Preparation of a porous membrane.

A web consisting of a paper prepared in accordance with Example 1 of French Pat. No. 1,272,081 is employed. The pores have a mean diameter of $0.05\mu$, and the paper has a thickness of $55\mu$ and weighs 25 g./m². This paper is impregnated by immersion at 25° C. for 10 seconds at a rate of 0.5 m./min. in a tank containing a 10 percent solution in cyclohexane of a composition comprising:

| | |
|---|---|
| $\alpha,\omega$-bis-dihydroxydimethylpolysiloxane oil having a viscosity of 5,000 cst. at 25° C. | 100 g. |
| silica of combustion having a large specific surface, treated with octamethylcyclotetrasiloxane | 20 g. |
| methyltriacetoxysilane | 3 g. |
| iron oxide passing through a $7.5\mu$ screen | 0.01 g. |

The evaporation of the solvent and the vulcanisation of the composition take place in the air at ambient temperature (25° C.) with a relative humidity of 50 percent. The critical surface tension of this elastomer is 23 dynes/cm. The weight of dry matter deposited on the paper is 3 g./m².

A disc is cut from this paper, the permeability of which to oxygen and carbon dioxide is measured in the experimental oxygenation cell described below.

The FIGURE diagrammatically represents apparatus for carrying out the process of the invention.

b. The measuring cell in which the oxygenation experiment takes place is shown diagrammatically in the accompanying drawing. It is composed of two superposed vertical cylindrical chambers 1, 2 separated by the membrane 3, to be tested. This membrane (of 30 cm.²) is itself supported by a metal gauze 4 (diameter of the wires 0.033 mm.–160 meshes/cm.)

The upper chamber 1, which is intended for the blood (the level of which is indicated by 11) is provided with a filling pipe 5, with a manometric tube 6 permitting a predetermined pressure to be maintained within the said chamber, with a probe 7 for the detection of the partial oxygen pressure in the blood (Beckman oxygen analyser) and with a magnetic stirring device 8, (this stirrer permits of homogenising the blood in the experimental cell in order that the indication of the probe may be significant). The lower chamber 2 comprises two nozzles 9, 10 for the circulation of the gas (air or oxygen) under the membrane. The upper chamber is also provided with a tube 12 for removal of oxygenated blood, so that the oxygenation can, if desired, be carried out continuously.

The upper chamber is filled with 200 cc. of citrated ox blood. The blood is maintained at 23° C. under a pressure of about 150 g./cm.² (i.e. slightly above arterial pressure). The lower chamber is swept by a current of dry oxygen (rate of travel 40 l./hr., pressure 10 g./cm.² above ambient pressure), and the variation of the oxygen partial pressure is followed by the detection device.

The oxygen partial pressure, which is 57.5 g./cm.² at the beginning of the experiment, is 97.5 g./cm.² at the end of 3 hours, and 225 g./cm.² at the end of 6 hours.

EXAMPLE 2

The oxygenation experiment of Example 1 is repeated, the silicone-impregnated paper membrane being replaced by a polyacrylonitrile membrane of a thickness of 200 $\mu$. The mean diameter of the pores in this membrane is about 0.4–0.5 $\mu$. This membrane, which is hydrophilic by nature, is waterproofed with the organopolysiloxane composition described in Example 1. The waterproofing is effected by two successive immersions and the weight of solids deposited is 19 g./m.².

Citrated ox blood is oxygenated, and the results obtained are as follows:

The oxygen partial pressure, which is 65.5 g./cm.² initially, rises to 120 g./cm.² at the end of 1 hour, 525 g./cm.² at the end of 3 hours, 635 g./cm.² at the end of 4 hours, and 770 g./cm.² at the end of 6 hours.

EXAMPLE 3

In the following table, there are set out the results of the oxygenation of water through various membranes according to the invention, and also through a conventional silicone membrane. This membrane, which has a thickness of 30 $\mu$, was produced from an organosilicon composition vulcanisable at elevated temperature with a peroxide, in 20 percent solution in cyclohexane, which is cast upon a temporary support and vulcanised by the usual methods.

It is generally preferred to compare the results obtained with water rather than with blood, because many factors intervene in the case of blood (origin, variable length of preservation, at variable temperature), which introduce variations which prejudice the precision of the comparative tests.

| Membrane | Mean pore diameter ($\mu$) | Critical surface tension (dynes/cm.) | Partial oxygen pressure (g./cm.²) | | | | |
|---|---|---|---|---|---|---|---|
| | | | Initial | After 15 min. | After 30 min. | After 60 min. | After 90 min. |
| Impregnated paper of Example 1 | 0.05 | 23 | 65.5 | 340 | 510 | 710 | 785 |
| Waterproofed polyacrylonitrile of Example 2 | 0.4–0.5 | 23 | 65.5 | 340 | 535 | 735 | 825 |
| Reinforced polyvinylchloride [1] | 0.1 | 39 | 65.5 | 270 | 415 | 635 | 745 |
| Silicone elastomer membrane | Nonporous | 23 | 65.5 | 98 | 140 | 212 | 280 |

[1] The reinforcement consists of a woven polyhexamethylene adipamide fabric, $70\mu$ thick, made of filaments having a diameter of $30\mu$, with 100 filaments per centimetre.

We claim:

1. In the process for the transfer of gas between an aqueous liquid phase and a gaseous phase, the partial pressure of the said gas in the two phases being different, and the two phases being separated by a membrane permeable to said gas such that gas from the phase in which the partial pressure of the said gas is greater is transferred through the membrane to the phase in which the partial pressure of the said gas is less, the improvement wherein the membrane permeable to said gas is a supported waterproof porous membrane having pores with an apparent diameter of 0.01 to 3 $\mu$ and having a critical surface tension less than 40 dynes/cm. at 20° C., the said liquid phase is brought into direct contact with the gaseous phase by passage through the pores of said membrane and the gaseous phase is flowing across the surface of said membrane and maintained at a pressure at most equal to the pressure in the liquid phase and at least 0.01 bar above atmospheric pressure.

2. Process according to claim 1 in which the aqueous liquid phase is blood.

3. Process according to claim 2 in which the gaseous phase contains oxygen at a partial pressure higher than the partial pressure of the oxygen in the blood.

4. Process according to claim 2 in which the gaseous phase contains carbon dioxide at a partial pressure lower than the partial pressure of the carbon dioxide in the blood.

5. Process according to claim 1 in which the membrane has pores of apparent diameter 0.05 to 1.5 $\mu$.

6. Process according to claim 1 in which the said membrane is a waterproofed polyacrylonitrile membrane.

7. Process according to claim 1 in which the said membrane is a waterproofed paper sheet with pores having an apparent diameter less than 0.05 $\mu$.

8. Process according to claim 6 in which the said membrane has been waterproofed with a vulcanized organopolysiloxane elastomer.

9. Process according to claim 7 in which the said membrane has been waterproofed with a vulcanized organopolysiloxane elastomer.

10. Process according to claim 1 in which the said membrane is a polyvinyl chloride membrane.

* * * * *